(12) United States Patent
Kubo (10) Patent No.: US 9,766,395 B2
(45) Date of Patent: Sep. 19, 2017

(54) LIGHT SOURCE DEVICE WITH A FIRST FRAME BODY, A SECOND FRAME BODY, AND A SPACER DISPOSED THEREBETWEEN

(71) Applicant: Japan Display Inc., Tokyo (JP)

(72) Inventor: Jihei Kubo, Tokyo (JP)

(73) Assignee: Japan Display Inc., Tokyo (JP)

( * ) Notice: Subject to any disclaimer, the term of this patent is extended or adjusted under 35 U.S.C. 154(b) by 37 days.

(21) Appl. No.: 14/918,821

(22) Filed: Oct. 21, 2015

(65) Prior Publication Data

US 2016/0147008 A1    May 26, 2016

(30) Foreign Application Priority Data

Nov. 20, 2014 (JP) .................. 2014-235253

(51) Int. Cl.
*F21V 8/00* (2006.01)

(52) U.S. Cl.
CPC ......... G02B 6/0091 (2013.01); G02B 6/0083 (2013.01); *G02B 6/0051* (2013.01); *G02B 6/0053* (2013.01); *G02B 6/0055* (2013.01); *G02B 6/0068* (2013.01); *G02B 6/0073* (2013.01)

(58) Field of Classification Search
CPC .. G02B 6/0081; G02B 6/0083; G02B 6/0085; G02B 6/009; G02B 6/0091; G02B 6/0093; G02B 6/0095; G02B 6/0096; G02F 1/133308

USPC .................................. 362/632–634
See application file for complete search history.

(56) References Cited

U.S. PATENT DOCUMENTS 9,110,214 B2 *  8/2015  Lee .................. G02F 1/133308
9,341,767 B2 *  5/2016  Jeong .................. G02B 6/0091

FOREIGN PATENT DOCUMENTS

JP        2008-027736        2/2008

* cited by examiner

*Primary Examiner* — Robert May
(74) *Attorney, Agent, or Firm* — K&L Gates LLP (57) ABSTRACT

According to an aspect, a light source device includes a light guide body, a first frame body on which a partial penetration part is formed, a second frame body, and a spacer held between the second frame body and the light guide body via the penetration part. The spacer includes a base part and a protrusion. The base part is formed to be larger than the penetration part, is held between the second frame body and the first frame body at an edge positioned around the penetration part, and causes the first frame body to be in intimate contact with an inner wall surface of the second frame body opposite to the base part. The protrusion is in contact with the light guide body to cause the light guide body to be in intimate contact with an inner wall surface of the first frame body opposite to the protrusion.

7 Claims, 5 Drawing Sheets

LIGHT SOURCE DEVICE WITH A FIRST FRAME BODY, A SECOND FRAME BODY, AND A SPACER DISPOSED THEREBETWEEN

CROSS REFERENCES TO RELATED APPLICATIONS

The present application claims priority to Japanese Priority Patent Application JP 2014-235253 filed in the Japan Patent Office on Nov. 20, 2014, the entire content of which is hereby incorporated by reference.

BACKGROUND

1. Technical Field

The present invention relates to a light source device.

2. Description of the Related Art

In the related art, known is a display device including a display panel that displays an image and a light source device that emits light toward the display panel. A light source device including a light guide body has been known as the light source device. The light source device emits light emitted from a light source to be expanded in a plane with the light guide body. The light guide body is attached to a frame body. To prevent a wobble from being generated between the light guide body and the frame body, a spacer made of rubber and the like is interposed between the light guide body and the frame body in the light source device disclosed in Japanese Patent Application Laid-open Publication No. 2008-27736.

The frame body may be attached to another frame body together with the light guide body. For example, the light guide body may be attached to a first frame body provided to a first frame member, and the first frame member may be attached to a second frame body provided to a second frame member. In this case, to prevent a wobble from being generated between the first frame body and the second frame body, it can be considered that a spacer is arranged between the first frame body and the second frame body. However, this method increases the number of components and complicates assembling work.

For the foregoing reasons, there is a need for a light source device that can reduce the number of components, and facilitate assembling work.

SUMMARY

According to an aspect, a light source device includes: a light guide body; a first frame member that has a first frame body surrounding an outer circumference of the light guide body and including a partial penetration part formed thereon, and houses the light guide body in a space surrounded by the first frame body; a second frame member that has a second frame body surrounding an outer circumference of the first frame body and houses the first frame body in a space surrounded by the second frame body; and a spacer held between the second frame body and the light guide body via the penetration part, wherein the spacer includes a base part arranged to be closer to the second frame body than the penetration part, and a protrusion projecting from the base part toward the light guide body via the penetration part, the base part is formed to be larger than the penetration part, is held between the second frame body and the first frame body at an edge positioned around the penetration part, and causes the first frame body to be in intimate contact with an inner wall surface of the second frame body positioned on an opposite side to the base part side, and the protrusion is in contact with the light guide body, and causes the light guide body to be in intimate contact with an inner wall surface of the first frame body positioned on an opposite side to the protrusion side.

Additional features and advantages are described herein, and will be apparent from the following Detailed Description and the figures.

DETAILED DESCRIPTION

The following describes embodiments in detail with reference to the drawings. The present invention is not limited to the embodiments described below. Components described below include a component that is easily conceivable by those skilled in the art and substantially the same component. The components described below can be appropriately combined. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same element as that described in the drawing that has already been discussed is denoted by the same reference numeral through the description and the drawings, and detailed description thereof will not be repeated in some cases.

First Embodiment

Figure 1:
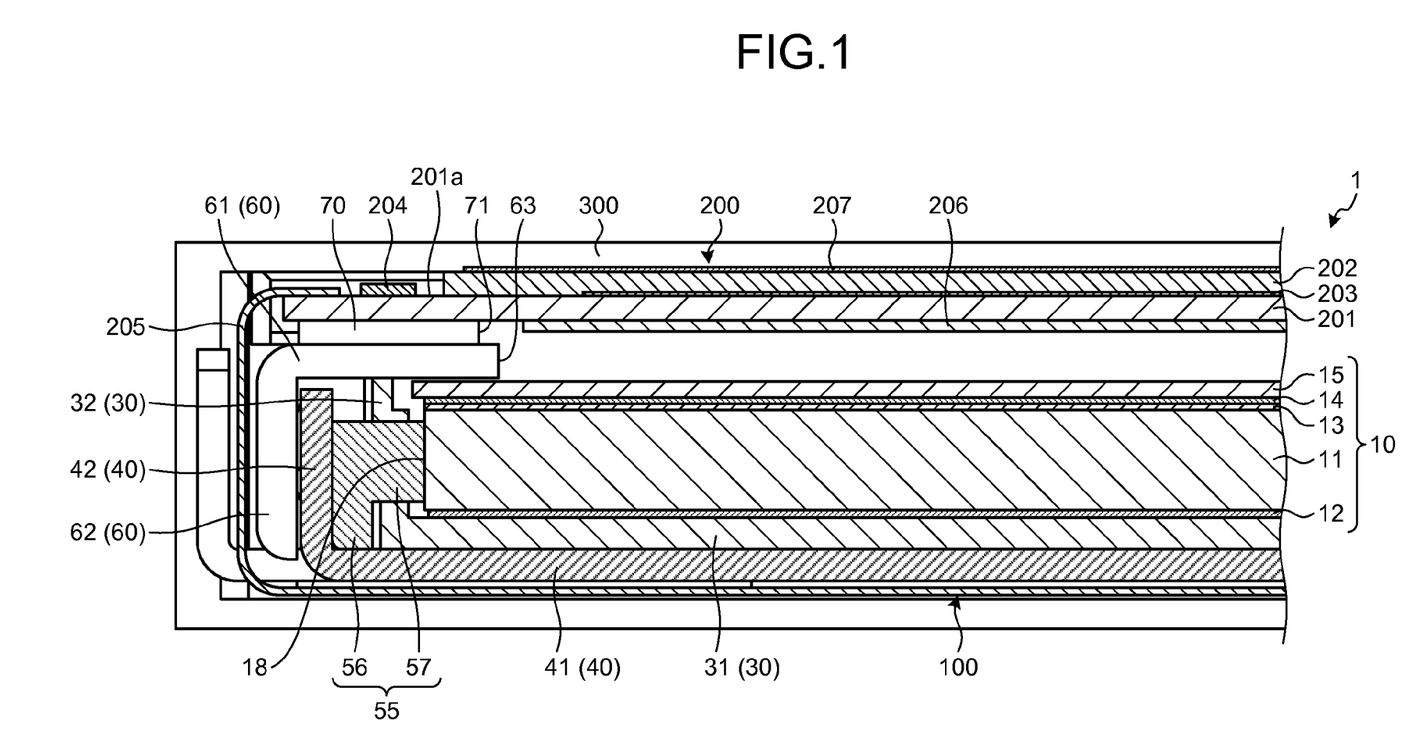
FIG. 1 is a cross-sectional view of an electronic apparatus according to a first embodiment.
Figure 2:
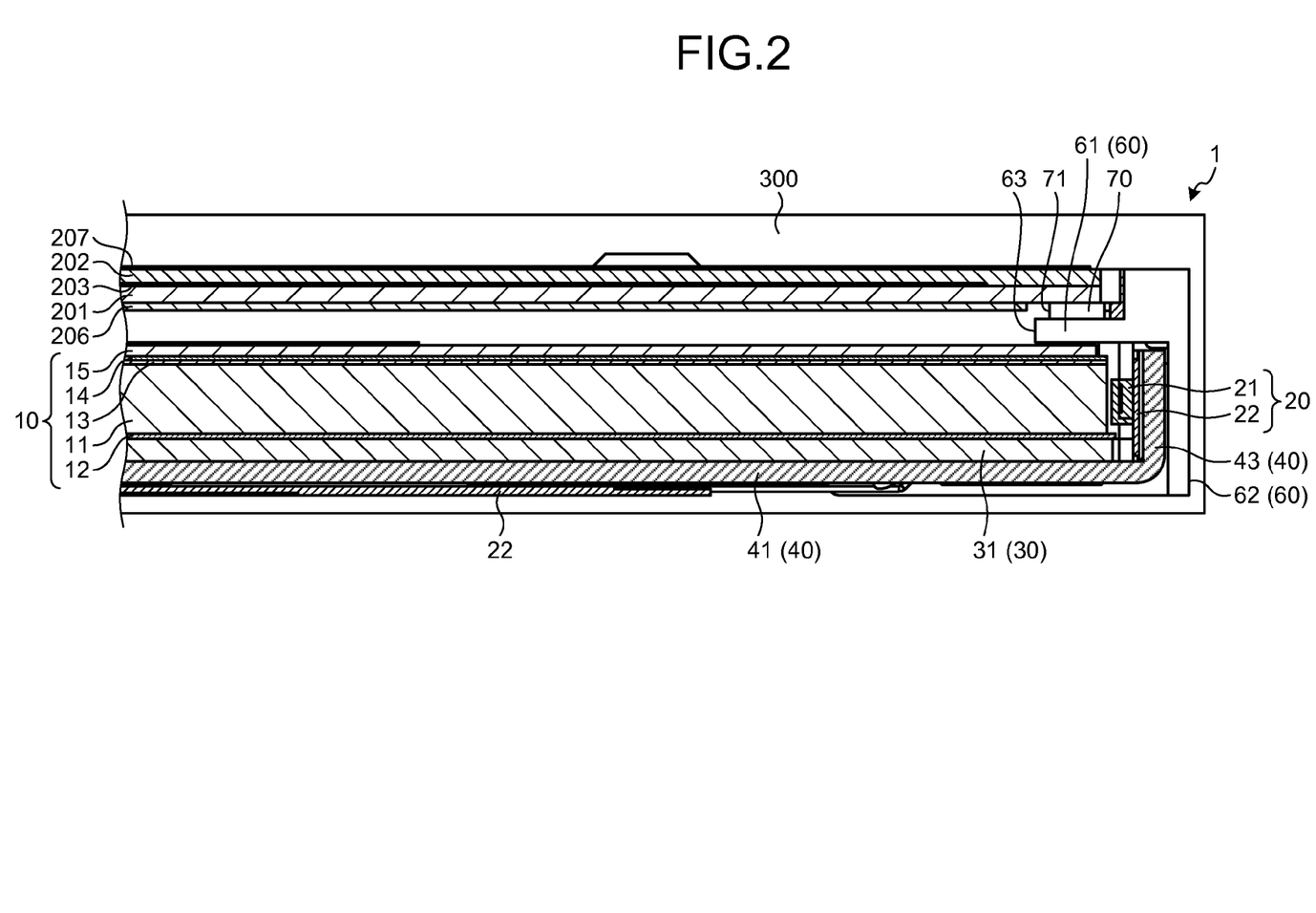
FIG. 2 is a cross-sectional view of the electronic apparatus according to the first embodiment.

FIGS. 1 and 2 are cross-sectional views of an electronic apparatus 1 according to a first embodiment of the present invention.

The electronic apparatus 1 is, for example, a display device including a light source device 100, a display panel 200, and a housing 300. For example, the electronic apparatus 1 modulates light emitted from the light source device 100 with the display panel 200 to display an image. FIG. 1 illustrates an end of the display panel 200 at which a terminal part 201a is arranged. FIG. 2 illustrates an end at which a light source 20 is arranged. The following describes arrangement of each member assuming that a direction from the light source device 100 toward the display panel 200 is "upper", a direction from the display panel 200 toward the light source device 100 is "lower", and a position in a horizontal direction orthogonal to a vertical direction is "lateral".

The light source device 100 includes a light guide body 10, the light source 20, an inner frame 30, a back cover 40, and a front cover 60. Each of the light guide body 10 and the inner frame 30 is fixed to the back cover 40, and each of upper parts thereof is covered by a top board 61 of the front cover 60. The back cover 40 is fitted into the front cover 60 in a state in which an outer wall surface of a second frame body 42 and an outer wall surface of a light source holding part 43 are laid along a side wall 62 of the front cover 60. On the top board 61, arranged is a light transmission part 63 that transmits light emitted from the light guide body 10 toward the display panel 200. An end of a flexible printed circuit board (FPC) 22 attached to the light source holding part 43 is drawn out toward a lower surface side of the back cover 40 through a gap between the light source holding part 43 and the second frame body 42. Details about the light source device 100 will be described later.

A display panel 200 is arranged on the top board 61 with a spacer 70 interposed therebetween. The display panel 200 includes, for example, a first substrate 201, a second substrate 202, a liquid crystal layer 203, a first polarizing layer 206, a second polarizing layer 207, a driving IC 204, and an FPC 205. The first substrate 201 and the second substrate 202 are arranged to be opposed to each other with the liquid crystal layer 203 interposed therebetween. The first polarizing layer 206 is arranged on the lower surface of the first substrate 201. The second polarizing layer 207 is arranged on the upper surface of the second substrate 202.

A penetration part 71 penetrating the spacer 70 from the light source device 100 toward the display panel 200 is arranged at a position opposed to the light transmission part 63. The first polarizing layer 206 is housed inside the penetration part 71. The penetration part 71 is larger than the first polarizing layer 206. The depth of the penetration part 71 is larger than the thickness of the first polarizing layer 206.

The first substrate 201 includes the terminal part 201a protruding toward the outside of the second substrate 202. The driving IC 204 and the FPC 205 are mounted on the terminal part 201a. An end of the FPC 205 is drawn out toward the lower surface side of the back cover 40 along the side wall 62. An image signal is input from the outside to the driving IC 204 via the FPC 205. The driving IC 204 controls orientation (a modulation amount) of the liquid crystal layer 203 based on the image signal. The light emitted from the light guide body 10 is transmitted through the first polarizing layer 206 to be incident on the liquid crystal layer 203, and is modulated by the liquid crystal layer 203. The light modulated by the liquid crystal layer 203 is transmitted through the second polarizing layer 207 to be recognized as an image.

The light source device 100 and the display panel 200 are housed inside the housing 300. Although not illustrated, the housing 300 includes a light transmission part that transmits the light transmitted through the second polarizing layer 207 to the outside of the housing 300. The FPC 22 and the FPC 205 are drawn out to the outside of the housing 300 through an opening (not illustrated) provided to the housing 300 via a gap between the back cover 40 and the housing 300.

Figure 3:
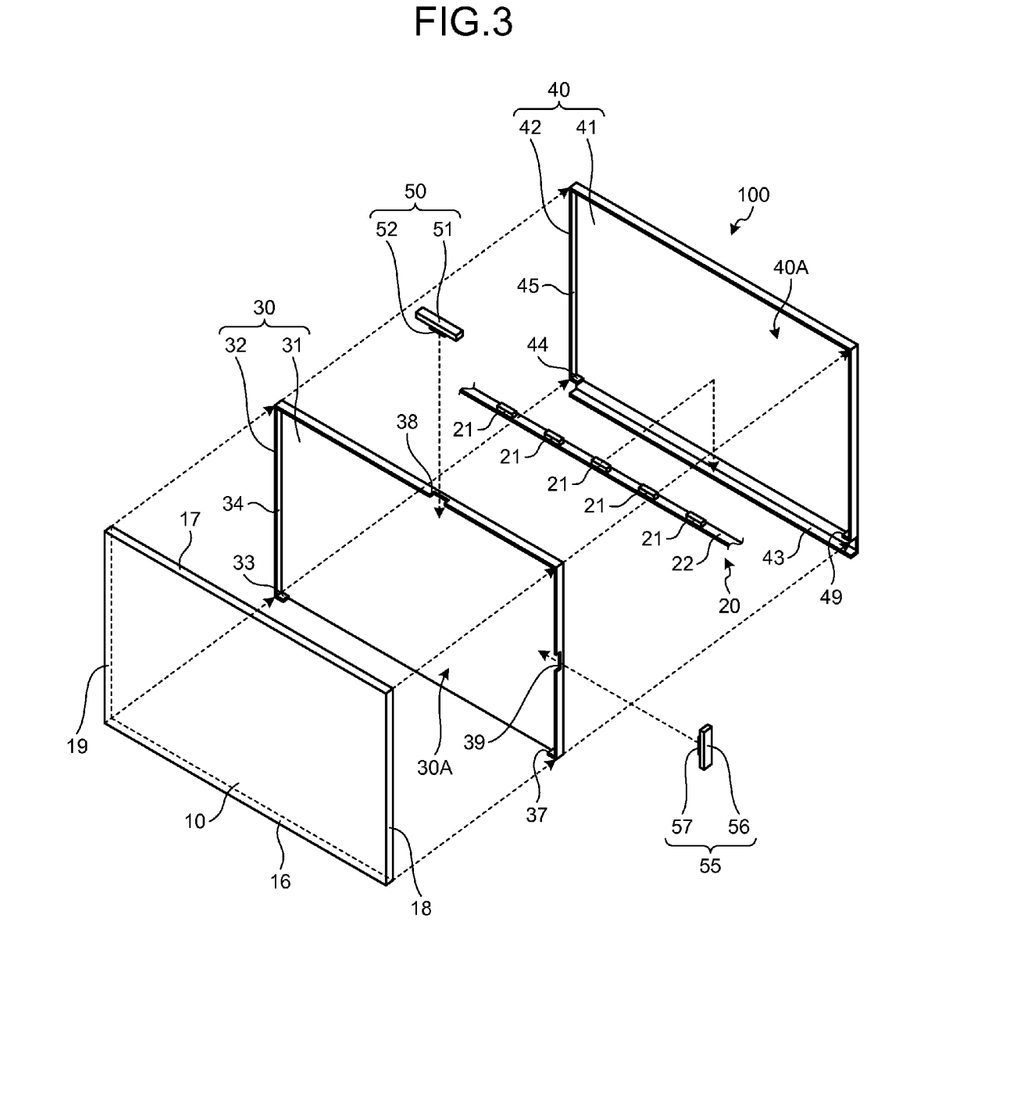
FIG. 3 is an exploded perspective view of a light source device.
Figure 4:
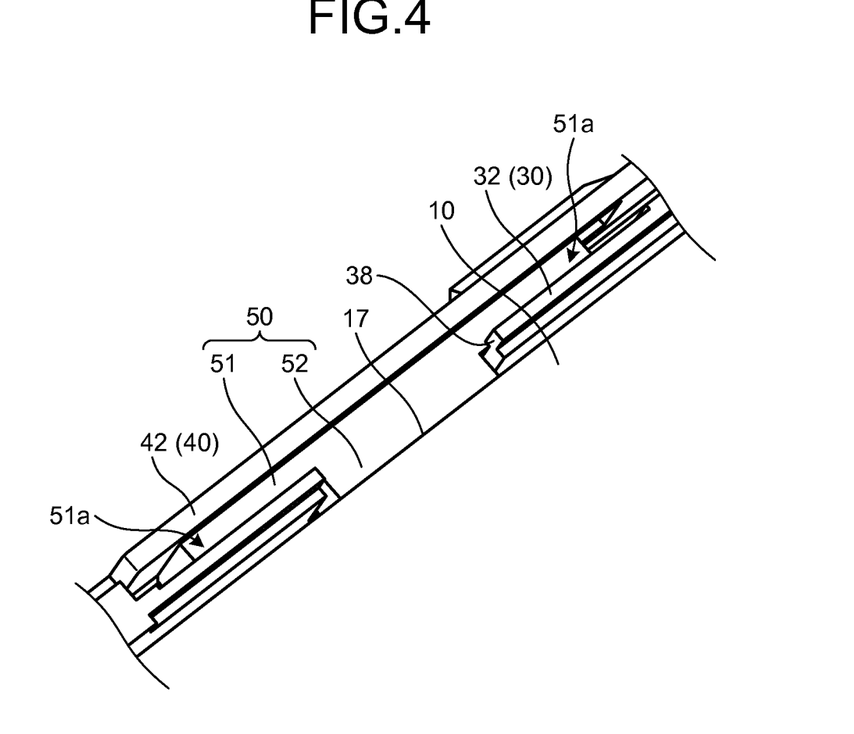
FIG. 4 is a schematic enlarged view of part of the light source device.
Figure 5:
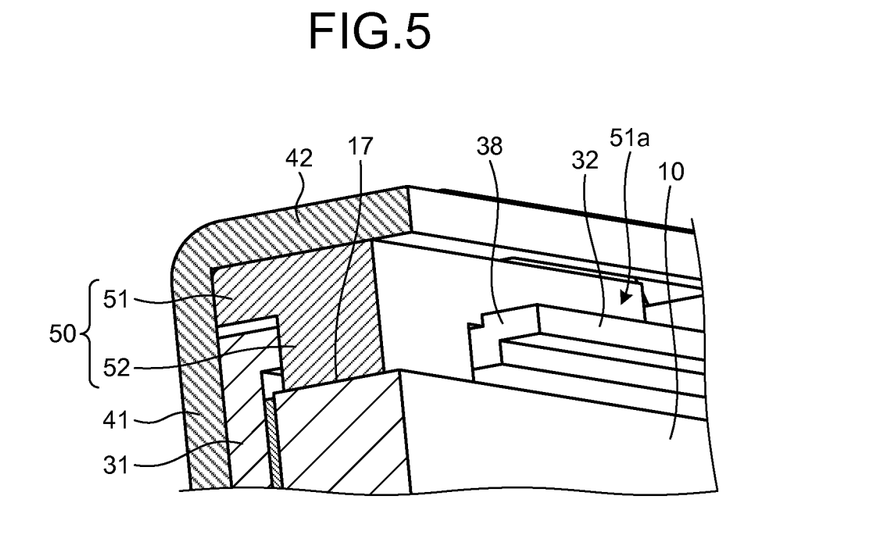
FIG. 5 is a schematic enlarged view of part of the light source device.

The following describes a configuration of the light source device 100 in detail. FIG. 3 is an exploded perspective view of the light source device 100. FIGS. 4 and 5 are schematic enlarged views of part of the light source device 100.

As illustrated in FIG. 3, the light source device 100 includes, for example, the light guide body 10, the light source 20, the inner frame 30, the back cover 40, a first spacer 50, a second spacer 55, and the front cover 60 (refer to FIG. 1).

The light guide body 10 is a plate member including a light guide plate. The light guide body 10 has, for example, a rectangular shape. As illustrated in FIG. 1, for example, the light guide body 10 includes a light guide plate 11, a reflective sheet 12, a first lens sheet 13, a second lens sheet 14, and a diffusion sheet 15. The reflective sheet 12 is arranged on the lower surface of the light guide plate 11, and reflects light leaked from the light guide plate 11 to be incident on the light guide plate 11. The first lens sheet 13, the second lens sheet 14, and the diffusion sheet 15 are arranged on the upper surface of the light guide plate 11 in this order. The first lens sheet 13 and the second lens sheet 14 enhance directivity of light emitted from the upper surface of the light guide plate 11. The diffusion sheet 15 appropriately diffuses the light the directivity of which is enhanced by the first lens sheet 13 and the second lens sheet 14. The reflective sheet 12, the first lens sheet 13, the second lens sheet 14, and the diffusion sheet 15 are not necessarily required, and are provided as needed.

As illustrated in FIG. 2, the light source 20 is arranged on a lateral side of the light guide body 10. The light source 20 enters light into the light guide body 10. Part of a side surface of the light guide body 10 is a light incident surface on which the light from the light source 20 is incident. According to the embodiment, for example, part of a first side surface 16 (refer to FIG. 3) corresponding to a long side of the light guide body 10 is the light incident surface. The form of the light source 20 is arbitrary. The light source 20 may be configured of a plurality of point-like light emitting bodies (such as light emitting diodes), or may be configured of a linear light emitting body (such as a cold-cathode tube).

As illustrated in FIG. 3, according to the embodiment, the light source 20 includes, for example, a plurality of light emitting bodies 21 and the FPC 22. The light emitting body 21 is a light emitting diode. The light emitting bodies 21 are mounted on the FPC 22. The light emitting bodies 21 are arranged being adjacent to each other along a longitudinal direction of the first side surface 16. Although the number of light emitting bodies 21 is six in FIG. 3, the number of light emitting bodies 21 is not limited thereto.

The light guide body 10 is attached to the inner frame 30 serving as a first frame member. The inner frame 30 includes a first bottom plate 31 and a first frame body 32. The first bottom plate 31 supports a lower surface of the light guide body 10. The first frame body 32 projects from the first bottom plate 31 toward the light guide body 10 to surround an outer circumference of the light guide body 10. The light guide body 10 is housed in a first space 30A surrounded by the first frame body 32. The first space 30A is slightly larger than the light guide body 10. The first frame body 32 includes, for example, a first light transmission part 37 that transmits the light from the light source 20 at a position opposed to the light incident surface of the light guide body 10. The first light transmission part 37 is, for example, a penetration part that penetrates the first frame body 32 from the second frame body 42 toward the light guide body 10. The first light transmission part 37 may be configured of a transparent member that transmits light.

The inner frame 30 is attached to the back cover 40 serving as a second frame member. The back cover 40 includes a second bottom plate 41, the second frame body 42, and the light source holding part 43. The second bottom plate 41 supports a lower surface of the inner frame 30. The second frame body 42 projects from the second bottom plate 41 toward the inner frame 30 to surround an outer circumference of the first frame body 32. The first frame body 32 is housed in a second space 40A surrounded by the second frame body 42. The second space 40A is slightly larger than the first frame body 32.

The second frame body 42 includes a second light transmission part 49 that transmits the light from the light source 20 at a position opposed to the first light transmission part 37. The second light transmission part 49 is, for example, a penetration part that penetrates the second frame body 42 from the light source 20 toward the first frame body 32. The second light transmission part 49 may be configured of a transparent member that transmits light. The light source holding part 43 projects from the second bottom plate 41 toward the inner frame 30, and is arranged to be opposed to the second light transmission part 49 at a position outside the second space 40A. The light source holding part 43 holds the light source 20 at a position opposed to the light incident surface of the light guide body 10.

On the first frame body 32, arranged is a penetration part that penetrates the first frame body 32 from the second frame body 42 toward the light guide body 10. The number of penetration parts is arbitrary. It is sufficient that the penetration part is formed on part of the first frame body 32. According to the embodiment, for example, a first penetration part 38 is arranged on the first frame body 32 at a position opposed to a second side surface 17 of the light guide body 10, and a second penetration part 39 is arranged thereon at a position opposed to a third side surface 18 of the light guide body 10. The second side surface 17 is a side surface (for example, a side surface corresponding to the long side of the light guide body 10) opposed to the first side surface 16. The third side surface 18 is a side surface (for example, a side surface corresponding to the short side of the light guide body 10) different from the first side surface 16 and the second side surface 17.

The first spacer 50 is fitted into the first penetration part 38. As illustrated in FIGS. 4 and 5, the first spacer 50 is held between the second frame body 42 and the light guide body 10 via the first penetration part 38. The first spacer 50 includes a base part 51 arranged to be closer to the second frame body 42 than the first penetration part 38, and a protrusion 52 projecting from the base part 51 toward the light guide body 10 via the first penetration part 38.

The base part 51 is formed to be larger than the first penetration part 38. The base part 51 is held between the second frame body 42 and the first frame body 32 at an edge 51a positioned around the first penetration part 38, and causes the first frame body 32 to be in intimate contact with an inner wall surface 44 (refer to FIG. 3) of the second frame body 42 positioned on the opposite side to the base part 51 side. The protrusion 52 is formed to have the same size as the first penetration part 38, or to be slightly smaller than the first penetration part 38. The protrusion 52 is in contact with the light guide body 10, and causes the light guide body 10 to be in intimate contact with an inner wall surface 33 (refer to FIG. 3) of the first frame body 32 positioned on the opposite side to the protrusion 52 side.

Accordingly, mutual positions of the light guide body 10, the first frame body 32, and the second frame body 42 are fixed in a first direction orthogonal to the second side surface 17. The mutual positions of the light guide body 10, the first frame body 32, and the second frame body 42 in the first direction are fixed with one first spacer 50, so that it is not necessary to separately provide a spacer for fixing the positions of the light guide body 10 and the first frame body 32 and a spacer for fixing the positions of the first frame body 32 and the second frame body 42. This configuration reduces the number of components, and facilitates assembling work.

The first spacer 50 is, for example, formed of an elastic member such as rubber. The first spacer 50 is flexibly deformed according to a size of a gap between the first frame body 32 and the second frame body 42 and a size of a gap between the light guide body 10 and the second frame body 42. Accordingly, even when the sizes of these gaps are changed due to influence of heat and the like, the first spacer 50 is deformed following that change to prevent a wobble from being generated between the light guide body 10 and the first frame body 32 and between the first frame body 32 and the second frame body 42.

For example, the first spacer 50 is arranged between the second frame body 42 and the light guide body 10 in a state of being compressed and deformed. Specifically, the edge 51a of the base part 51 is arranged between the second frame body 42 and the first frame body 32 in a state of being compressed and deformed. The base part 51 and the protrusion 52 arranged at a position opposed to the first penetration part 38 are arranged between the second frame body 42 and the light guide body 10 in a state of being compressed and deformed.

With this configuration, the first frame body 32 is biased toward the opposite side to the base part 51 side by the edge 51a of the base part 51, and is pressed against the inner wall surface 44 of the second frame body 42 positioned on the opposite side to the base part 51 side. The light guide body 10 is biased toward the opposite side to the protrusion 52 side by the protrusion 52, and is pressed against the inner wall surface 33 of the first frame body 32 positioned on the opposite side to the protrusion 52 side. Accordingly, adhesion between the second frame body 42 and the first frame body 32 and adhesion between the first frame body 32 and the light guide body 10 are enhanced, and the mutual positions of the light guide body 10, the first frame body 32, and the second frame body 42 in the first direction are firmly fixed.

Returning to FIG. 3, the second spacer 55 is fitted into the second penetration part 39. The second spacer 55 is held between the second frame body 42 and the light guide body 10 via the second penetration part 39. The second spacer 55 includes a base part 56 arranged to be closer to the second frame body 42 than the second penetration part 39, and a protrusion 57 projecting from the base part 56 toward the light guide body 10 via the second penetration part 39.

The base part 56 is formed to be larger than the second penetration part 39. The base part 56 is held between the second frame body 42 and the first frame body 32 at an edge positioned around the second penetration part 39, and causes the first frame body 32 to be in intimate contact with an inner wall surface 45 of the second frame body 42 positioned on the opposite side to the base part 56 side. The protrusion 57 is formed to have the same size as the second penetration part 39, or to be slightly smaller than the second penetration part 39. The protrusion 57 is in contact with the light guide body 10, and causes the light guide body 10 to be in intimate contact with an inner wall surface 34 of the first frame body 32 positioned on the opposite side to the protrusion 57 side.

Accordingly, the mutual positions of the light guide body 10, the first frame body 32, and the second frame body 42 are fixed in a second direction orthogonal to the third side surface 18. The mutual positions of the light guide body 10, the first frame body 32, and the second frame body 42 in the second direction are fixed with one second spacer 55, so that it is not necessary to separately provide a spacer for fixing the positions of the light guide body 10 and the first frame body 32 and a spacer for fixing the positions of the first frame body 32 and the second frame body 42. This configuration reduces the number of components, and facilitates assembling work.

The second spacer 55 is, for example, formed of an elastic member such as rubber. The second spacer 55 is flexibly deformed according to the size of the gap between the first frame body 32 and the second frame body 42 and the size of the gap between the light guide body 10 and the second frame body 42. Accordingly, even when the sizes of these gaps are changed due to influence of heat and the like, the second spacer 55 is deformed following that change to prevent a wobble from being generated between the light guide body 10 and the first frame body 32 and between the first frame body 32 and the second frame body 42.

For example, the second spacer 55 is arranged between the second frame body 42 and the light guide body 10 in a state of being compressed and deformed. Specifically, the edge of the base part 56 is arranged between the second frame body 42 and the first frame body 32 in a state of being compressed and deformed. The base part 56 and the protrusion 57 arranged at a position opposed to the second penetration part 39 are arranged between the second frame body 42 and the light guide body 10 in a state of being compressed and deformed.

With this configuration, the first frame body 32 is biased toward the opposite side to the base part 56 side by the edge of the base part 56, and is pressed against the inner wall surface 45 of the second frame body 42 positioned on the opposite side to the base part 56 side. The light guide body 10 is biased toward the opposite side to the protrusion 57 side by the protrusion 57, and is pressed against the inner wall surface 34 of the first frame body 32 positioned on the opposite side to the protrusion 57 side. Accordingly, the adhesion between the second frame body 42 and the first frame body 32 and the adhesion between the first frame body 32 and the light guide body 10 are enhanced, and the mutual positions of the light guide body 10, the first frame body 32, and the second frame body 42 in the second direction are firmly fixed.

In the electronic apparatus 1 according to the embodiment described above, the light guide body 10, the first frame body 32, and the second frame body 42 are fixed to each other with the first spacer 50 and the second spacer 55. The mutual positions of the light guide body 10, the first frame body 32, and the second frame body 42 in the first direction (direction orthogonal to the second side surface 17) are fixed with one first spacer 50, and the mutual positions of the light guide body 10, the first frame body 32, and the second frame body 42 in the second direction (direction orthogonal to the third side surface 18) are fixed with one second spacer 55. With this configuration, it is not necessary to separately provide the spacer for fixing the mutual positions of the light guide body 10 and the first frame body 32 and the spacer for fixing the mutual positions of the first frame body 32 and the second frame body 42 both in the first direction and the second direction. This configuration reduces the number of components, and facilitates assembling work.

According to the embodiment, the light source 20 is arranged to be opposite to the first spacer 50 across the light guide body 10. The light guide body 10 is in intimate contact with the inner wall surface 33 of the first frame body 32 arranged on the light source 20 side. The first frame body 32 is in intimate contact with the inner wall surface 44 of the second frame body 42 arranged on the light source 20 side. Accordingly, a distance between the light source 20 and the light guide body 10 can be easily maintained. Thus, unevenness of brightness hardly occurs in the light guide body 10.

Second Embodiment

Figure 6:
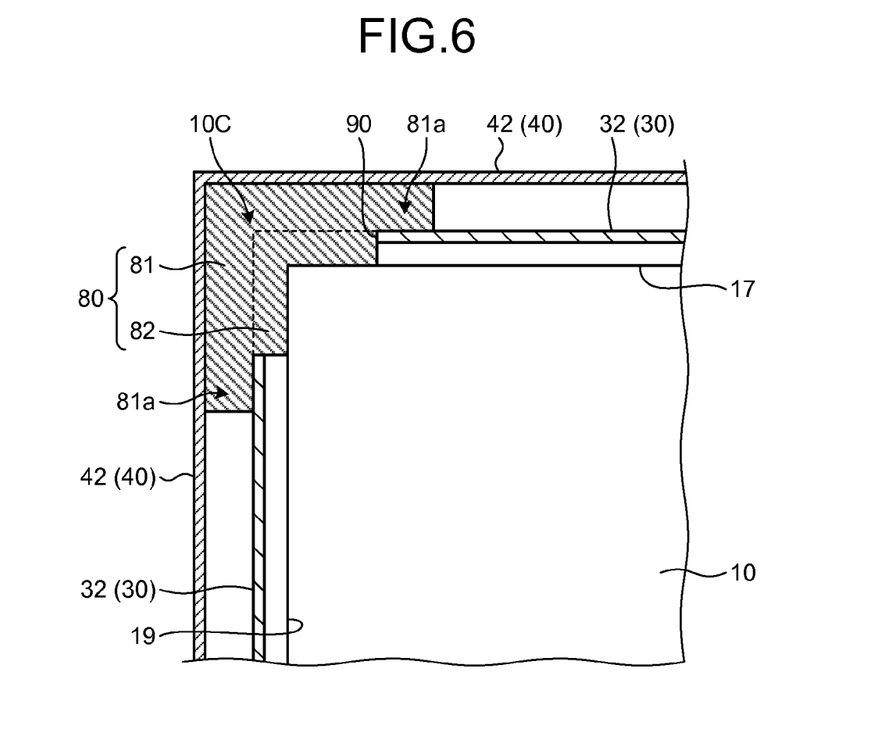
FIG. 6 is a schematic diagram of a spacer according to a second embodiment.

FIG. 6 is a schematic diagram of the spacer according to another embodiment. In this embodiment, components common to those in the first embodiment are denoted by the same reference numerals, and detailed description thereof will not be repeated.

In the first embodiment, the mutual positions of the light guide body 10, the first frame body 32, and the second frame body 42 are fixed both in the first direction and the second direction using two spacers (the first spacer 50 and the second spacer 55). In this embodiment, a penetration part 90 and a spacer 80 are arranged along a corner part 10C of the light guide body 10. The mutual positions of the light guide body 10, the first frame body 32, and the second frame body 42 in the first direction and the second direction are fixed with one spacer 80.

The light guide body 10 has two side surfaces adjacent to each other with the corner part 10C therebetween. Although the corner part 10C has a sharpened shape in FIG. 6, the corner part 10C may have a rounded shape. The penetration part 90 is provided at a position opposed to both the two side surfaces. The position of the corner part 10C is arbitrary. In this embodiment, the penetration part 90 is arranged in the vicinity of the corner part 10C at which the second side surface 17 intersects with a fourth side surface 19. The penetration part 90 is continuously arranged from a position opposed to the second side surface 17 to a position opposed to the fourth side surface 19 along the corner part 10C, for example.

The spacer 80 is fitted into the penetration part 90. The spacer 80 is held between the second frame body 42 and the light guide body 10 via the penetration part 90. The spacer 80 includes a base part 81 arranged to be closer to the second frame body 42 than the penetration part 90, and a protrusion 82 projecting from the base part 81 toward the light guide body 10 via the penetration part 90.

The base part 81 is formed to be larger than the penetration part 90. The base part 81 is held between the second frame body 42 and the first frame body 32 at an edge 81a positioned around the penetration part 90, and causes the first frame body 32 to be in intimate contact with an inner wall surface of the second frame body 42 positioned on the opposite side to the base part 81 side.

In this embodiment, the base part 81 is continuously arranged from the position opposed to the second side surface 17 to the position opposed to the fourth side surface 19 along the corner part 10C. The base part 81 is held between the first frame body 32 and the second frame body 42 at positions opposed to the two side surfaces (the second side surface 17 and the fourth side surface 19). Accordingly, the first frame body 32 is in intimate contact with the inner wall surface of the second frame body 42 opposed to the first side surface 16 (refer to FIG. 3) and an inner wall surface of the second frame body 42 opposed to the third side surface 18 (refer to FIG. 3). Thus, the position of the first frame body 32 in the first direction orthogonal to the second side surface 17 and the position thereof in the second direction orthogonal to the fourth side surface 19 are fixed at the same time.

The protrusion 82 is formed to have the same size as the penetration part 90, or to be slightly smaller than the penetration part 90. The protrusion 82 is in contact with the light guide body 10, and causes the light guide body 10 to be in intimate contact with an inner wall surface of the first frame body 32 positioned on the opposite side to the protrusion 82 side.

In this embodiment, the protrusion 82 is continuously arranged from the position opposed to the second side surface 17 to the position opposed to the fourth side surface 19 along the corner part 10C. The protrusion 82 is in contact with the two side surfaces (the second side surface 17 and the fourth side surface 19). Accordingly, the light guide body 10 is in intimate contact with the inner wall surface of the first frame body 32 opposed to the first side surface 16 (refer to FIG. 3) and an inner wall surface of the first frame body 32 opposed to the third side surface 18 (refer to FIG. 3). Thus, the position of the light guide body 10 in the first direction orthogonal to the second side surface 17 and the position thereof in the second direction orthogonal to the fourth side surface 19 are fixed at the same time.

The spacer 80 is, for example, formed of an elastic member such as rubber. The spacer 80 is flexibly deformed according to the size of the gap between the first frame body 32 and the second frame body 42 and the size of the gap between the light guide body 10 and the second frame body 42. The spacer 80 is, for example, arranged between the second frame body 42 and the light guide body 10 in a state of being compressed and deformed.

Specifically, the edge 81a of the base part 81 is arranged between the second frame body 42 and the first frame body 32 in a state of being compressed and deformed. The base part 81 and the protrusion 82 arranged at a position opposed to the penetration part 90 are arranged between the second frame body 42 and the light guide body 10 in a state of being compressed and deformed. Accordingly, the adhesion between the second frame body 42 and the first frame body 32 and the adhesion between the first frame body 32 and the light guide body 10 are enhanced, and the mutual positions of the light guide body 10, the first frame body 32, and the second frame body 42 are firmly fixed.

As described above, according to this embodiment, the mutual positions of the light guide body 10, the first frame body 32, and the second frame body 42 in the first direction orthogonal to the second side surface 17 are fixed with the spacer 80 arranged at the position opposed to the second side surface 17. The mutual positions of the light guide body 10, the first frame body 32, and the second frame body 42 in the second direction orthogonal to the fourth side surface 19 are fixed with the spacer 80 arranged at the position opposed to the fourth side surface 19. The mutual positions of the light guide body 10, the first frame body 32, and the second frame body 42 in the first direction and the second direction are fixed with one spacer 80, so that it is not necessary to separately provide a spacer for fixing each position in each direction. This configuration reduces the number of components, and facilitates assembling work.

Third Embodiment

Figure 7:
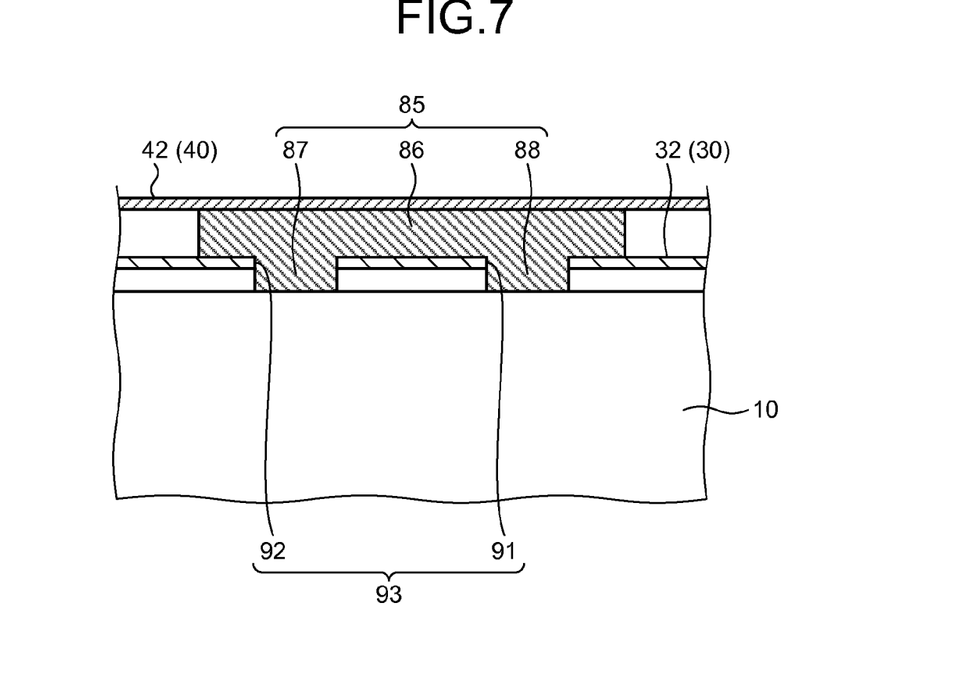
FIG. 7 is a schematic diagram of a spacer according to a third embodiment.

FIG. 7 is a schematic diagram of a spacer according to another embodiment. In this embodiment, components common to those in the first embodiment are denoted by the same reference numerals, and detailed description thereof will not be repeated.

According to the first embodiment, one side surface of the light guide body 10 is supported by one protrusion. In this embodiment, one side surface of the light guide body 10 is supported by a plurality of protrusions (a first protrusion 87 and a second protrusion 88).

A spacer 85 includes a plurality of protrusions arranged along an outer circumference of the light guide body 10. In this embodiment, the spacer 85 includes two protrusions (the first protrusion 87 and the second protrusion 88). However, the number of protrusions is not limited thereto. A penetration part 93 has a plurality of through holes (a first through hole 91 and a second through hole 92) through which the protrusions pass toward the light guide body 10.

The spacer 85 is held between the second frame body 42 and the light guide body 10 via the penetration part 93. The spacer 85 includes a base part 86 arranged to be closer to the second frame body 42 than the penetration part 93, and a plurality of protrusions (the first protrusion 87 and the second protrusion 88) projecting from the base part 86 toward the light guide body 10 via the penetration part 93. The base part 86 is formed to be large to extend over the protrusions.

With this configuration, the spacer 85 is in contact with the light guide body 10 at a plurality of points with the protrusions, so that the position of the light guide body 10 is stably fixed. The base part 86 is formed to be large to extend over the protrusions, so that the position of the first frame body 32 is also stably fixed.

The preferred embodiments of the present invention have been described above. However, the present invention is not limited thereto. Content disclosed in the embodiments is merely an example, and various modifications can be made without departing from the gist of the invention. The present invention naturally encompasses an appropriate modification maintaining the gist of the invention.

For example, in the first embodiment, one spacer is provided to one side surface of the light guide body 10. However, the number of spacers provided to one side surface is not limited thereto. A plurality of spacers may be provided to one side surface of the light guide body 10.

In the first to third embodiments, the light guide body 10 having a rectangular shape is exemplified. However, the shape of the light guide body 10 is not limited to the rectangular shape. The present invention can be applied to light guide bodies having various shapes such as a polygon other than a rectangle or a shape using a curved line including a circle.

FIGS. 1 and 2 illustrate a display device as an example of the electronic apparatus to which the light source device according to the present invention is applied. However, the electronic apparatus to which the light source device according to the present invention is applied is not limited to the display device. The light source device according to the present invention can be widely applied to electronic apparatuses other than the display device, such as a lighting apparatus for illuminating the inside of a building.

The configurations disclosed in the first to third embodiments are merely an example, and these configurations may be appropriately combined or appropriately modified without departing from the gist of the present invention. It is sufficient that the spacer has at least the following aspect.

That is, the spacer is held between the second frame body 42 and the light guide body 10 via the penetration part, and causes the light guide body 10 to be in intimate contact with the inner wall surface of the first frame body 32 on the opposite side to the penetration part side. The base part arranged closer to the second frame body 42 than the penetration part is formed to be larger than the penetration part. The edge of the base part positioned around the penetration part is held between the second frame body 42 and the first frame body 32, and the first frame body 32 is caused to be in intimate contact with the inner wall surface of the second frame body 42 positioned on the opposite side to the base part side. With such a configuration, positions of the light guide body 10, the first frame body 32, and the second frame body 42 in at least one direction can be fixed at the same time with one spacer.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A light source device comprising:
   a light guide body;
   a first frame member that has a first frame body surrounding an outer circumference of the light guide body and including a partial penetration part formed thereon, and houses the light guide body in a space surrounded by the first frame body;
   a second frame member that has a second frame body surrounding an outer circumference of the first frame body and that houses the first frame body in a space surrounded by the second frame body; and
   a spacer held between the second frame body and the light guide body via the penetration part,
   wherein
   the spacer includes
      a base part, and
      a protrusion,
   the base part, which is formed to be larger than the penetration part, is held between the second frame body and the first frame body at an edge positioned around the penetration part, and
   the protrusion is projected from the base part toward the light guide body via the penetration part to be in contact with the light guide body.

2. The light source device according to claim 1, wherein the spacer is formed of an elastic member.

3. The light source device according to claim 2, wherein the spacer is arranged between the second frame body and the light guide body in a state of being compressed and deformed.

4. The light source device according to any one of claim 1, further comprising:
   a light source that enters light into the light guide body, wherein
   the light source is arranged to be opposite to the spacer across the light guide body.

5. The light source device according to claim 1, wherein the light guide body has two side surfaces adjacent to each other with a corner part therebetween,
   the penetration part is arranged at positions opposed to the two side surfaces,
   the protrusion is in contact with both of the two side surfaces, and
   the base part is held between the first frame body and the second frame body at positions opposed to the two side surfaces.

6. The light source device according to claim 1, wherein the spacer includes a plurality of protrusions arranged along an outer circumference of the light guide body, and
   the penetration part includes a plurality of through holes through which the protrusions pass toward the light guide body.

7. A light source device comprising:
   a light guide body;
   a first frame member that has a first frame body surrounding an outer circumference of the light guide body and that houses the light guide body in a space surrounded by the first frame body;
   a second frame member that has a second frame body surrounding an outer circumference of the first frame body and that houses the first frame body in a space surrounded by the second frame body; and
   a spacer held between the second frame body and the light guide body via a penetration part,
   wherein
   the first frame body includes:
      a first inner wall that has the penetration part; and
      a second inner wall that is disposed at an opposite side to the first inner wall in the first frame body, the light guide body being disposed between the first inner wall and the second inner wall,
   the second frame body includes:
      a first outer wall that is positioned at a same side of the first inner wall when viewed from a first direction vertical to the light guide body; and
      a second outer wall that is positioned at a same side of the second inner wall when viewed from the first direction,
   the spacer includes a base part and a protrusion,
   the base part, which is formed to be larger than the penetration part, is held between the first inner wall and the first outer wall at an edge positioned around the penetration part to bias the first inner wall toward the second outer wall, and
   the protrusion projects from the base part toward the light guide body via the penetration part and is in contact with the light guide body to bias the light guide body toward the second inner wall.

* * * * *